US011425139B2

(12) United States Patent
Desai et al.

(10) Patent No.: US 11,425,139 B2
(45) Date of Patent: Aug. 23, 2022

(54) ENFORCING LABEL-BASED RULES ON A PER-USER BASIS IN A DISTRIBUTED NETWORK MANAGEMENT SYSTEM

(71) Applicant: Illumio, Inc., Sunnyvale, CA (US)

(72) Inventors: Anish V. Desai, Palo Alto, CA (US); Juraj G. Fandli, Campbell, CA (US); Matthew Glenn, Mountain View, CA (US); Mukesh Gupta, Milpitas, CA (US); Paul J. Kirner, Palo Alto, CA (US)

(73) Assignee: Illumio, Inc., Sunnyvale, CA (US)

( * ) Notice: Subject to any disclaimer, the term of this patent is extended or adjusted under 35 U.S.C. 154(b) by 69 days.

(21) Appl. No.: 16/874,411

(22) Filed: May 14, 2020

(65) Prior Publication Data

US 2021/0051154 A1    Feb. 18, 2021

Related U.S. Application Data

(63) Continuation of application No. 15/433,949, filed on Feb. 15, 2017, now abandoned.

(60) Provisional application No. 62/296,052, filed on Feb. 16, 2016.

(51) Int. Cl.
| | |
|---|---|
| *H04L 29/06* | (2006.01) |
| *H04L 9/40* | (2022.01) |
| *H04L 67/53* | (2022.01) |
| *H04L 67/51* | (2022.01) |
| *G06F 21/62* | (2013.01) |

(52) U.S. Cl.
CPC .......... *H04L 63/104* (2013.01); *G06F 21/62* (2013.01); *H04L 63/105* (2013.01); *H04L 63/205* (2013.01); *H04L 67/16* (2013.01); *H04L 67/20* (2013.01)

(58) Field of Classification Search
None
See application file for complete search history.

(56) References Cited

U.S. PATENT DOCUMENTS

| 6,065,054 | A | * | 5/2000 | Dutcher | ............... G06F 21/604 |
| | | | | | 709/225 |
| 2001/0007133 | A1 | * | 7/2001 | Moriconi | .............. H04L 63/102 |
| | | | | | 709/224 |
| 2002/0138631 | A1 | * | 9/2002 | Friedel | .................... H04L 63/20 |
| | | | | | 709/229 |

(Continued)

OTHER PUBLICATIONS

Extended European Search Report, European Application No. 17753772. 7, dated Aug. 19, 2019, 7 pages.

(Continued)

*Primary Examiner* — William J. Goodchild
(74) *Attorney, Agent, or Firm* — Fenwick & West LLP

(57) ABSTRACT

State information is received from a server indicating an identity of a user logged into the server. An administrative domain wide policy is determined that specifies a relationship between user a group and services or servers accessible to users belonging to the user group. Relevant servers are sent updated management instructions corresponding to rules of the administrative domain wide policy. Such rules provide access to a service or server to users belonging to user groups related to the service. As a result, the servers allow communications that provide access to users based on the specified relationships.

20 Claims, 11 Drawing Sheets

(56) References Cited

U.S. PATENT DOCUMENTS

| | | | |
|---|---|---|---|
| 2002/0138738 A1* | 9/2002 | Sames | H04L 63/1416 |
| | | | 713/185 |
| 2002/0181691 A1* | 12/2002 | Miller | H04M 3/42153 |
| | | | 379/234 |
| 2003/0131245 A1* | 7/2003 | Linderman | H04L 63/0218 |
| | | | 713/176 |
| 2003/0229501 A1* | 12/2003 | Copeland | G06Q 10/10 |
| | | | 709/225 |
| 2004/0177247 A1* | 9/2004 | Peles | H04L 63/08 |
| | | | 713/155 |
| 2004/0215649 A1 | 10/2004 | Whalen et al. | |
| 2005/0235044 A1* | 10/2005 | Tazuma | H04L 61/6013 |
| | | | 709/217 |
| 2007/0094716 A1* | 4/2007 | Farino | H04L 63/101 |
| | | | 726/5 |
| 2007/0282951 A1* | 12/2007 | Selimis | H04L 67/36 |
| | | | 709/205 |
| 2008/0172366 A1 | 7/2008 | Hannel et al. | |
| 2012/0151551 A1 | 6/2012 | Readshaw et al. | |
| 2013/0029641 A1* | 1/2013 | Hickie | H04W 12/088 |
| | | | 455/410 |
| 2013/0091214 A1* | 4/2013 | Kellerman | G06Q 10/00 |
| | | | 709/204 |
| 2014/0343989 A1* | 11/2014 | Martini | H04L 63/104 |
| | | | 705/7.17 |
| 2015/0188758 A1* | 7/2015 | Amidei | H04L 41/0896 |
| | | | 709/220 |
| 2016/0255086 A1* | 9/2016 | Vajravelu | H04L 63/101 |
| | | | 726/4 |

OTHER PUBLICATIONS

PCT International Search Report and Written Opinion for PCT/US17/18004, dated May 19, 2017, 12 Pages.

United States Office Action, U.S. Appl. No. 15/433,949, filed Nov. 15, 2019, 16 pages.

United States Office Action, U.S. Appl. No. 15/433,949, filed Apr. 3, 2019, 16 pages.

* cited by examiner

ENFORCING LABEL-BASED RULES ON A PER-USER BASIS IN A DISTRIBUTED NETWORK MANAGEMENT SYSTEM

CROSS REFERENCES TO RELATED APPLICATION

This application is a continuation of U.S. application Ser. No. 15/433,949, filed Feb. 15, 2017, now abandoned, which application claims the benefit of U.S. Provisional Application No. 62/296,052 filed on Feb. 16, 2016, which is incorporated by reference herein in its entirety.

BACKGROUND

1. Technical Field

The subject matter described herein generally relates to the field of managing servers (physical or virtual) of an administrative domain and, in particular, to managing security of services provided by managed servers based on user groups.

2. Background Information

Enterprises provide services to users via electronic devices (physical or virtual) connected via a computer network. An enterprise may use virtual desktop infrastructure (VDI) implementation located in its data centers to allow users to access the services. Desktop virtualization allows a limited number of devices to be shared by multiple users, thereby lowering IT (information technology) costs for enterprises. However, use of desktop virtualization increases the number of services that each device can potentially access since each device is shared by multiple users. As a result, enforcing security of devices connected over the network domain becomes more difficult.

Conventional security policies reference physical devices and are expressed in terms of low-level constructs such as IP (Internet Protocol) addresses, IP address ranges, subnetworks, and network interfaces. A virtual or physical device may be accessed by multiple users having different levels of authorization to access different services and devices. A policy enforced solely at the device level would allow the device access to any service used by at least one of the device's users. As a result, a user typically has access to more services than used by the user. Providing access to unused services presents a security risk. If a user's account is compromised, many services may be exposed to attack even though the compromised account does not require access to all of the services.

SUMMARY

The above and other issues are addressed by a method, non-transitory computer-readable storage medium, and system for managing security of services executing on servers in a network domain.

An embodiment of a method performs management of security of services executing on servers in a network domain. Information describing one or more user groups containing users associated with the network domain is received. An administrative domain wide policy is determined based on the received association. The administrative domain wide policy specifies a relationship between the user group and a set of labeled entities. A labeled entity may be a service or a server. The relationship allows users of the user group to access the labeled entities from the set of labeled entities. Management instructions are generated for regulating communications between servers of the network domain based on the generated rule. The updated management instructions are sent to one or more servers to configure the server to implement the administrative domain wide policy.

An embodiment of a computer readable non-transitory storage medium stores instructions for performing the following steps. The steps comprise receiving information describing one or more user groups containing users associated with a network domain. The steps further comprise determining an administrative domain wide policy based on the received association. The administrative domain wide policy specifies a relationship between the user group and a set of labeled entities. A labeled entity may be a service or a server. The relationship allows users of the user group to access the labeled entities from the set of labeled entities. The steps further comprise generating updated management instructions regulating communications between servers of the network domain based on the generated rule. The steps further comprise sending the updated management instructions to one or more servers to configure the server to implement the administrative domain wide policy.

An embodiment of a computer system comprises one or more processors and a computer readable non-transitory storage medium storing instructions for execution by the one or more processors. The computer readable non-transitory storage medium stores instructions for performing the following steps. The steps comprise receiving information describing one or more user groups containing users associated with a network domain. The steps further comprise determining an administrative domain wide policy based on the received association. The administrative domain wide policy specifies a relationship between the user group and a set of labeled entities. A labeled entity may be a service or a server. The relationship allows users of the user group to access the labeled entities from the set of labeled entities. The steps further comprise generating updated management instructions regulating communications between servers of the network domain based on the generated rule. The steps further comprise sending the updated management instructions to one or more servers to configure the server to implement the administrative domain wide policy.

The features and advantages described in this summary and the following detailed description are not all-inclusive. Many additional features and advantages will be apparent to one of ordinary skill in the art in view of the drawings, specification, and claims hereof.

DETAILED DESCRIPTION

Figure 1A:
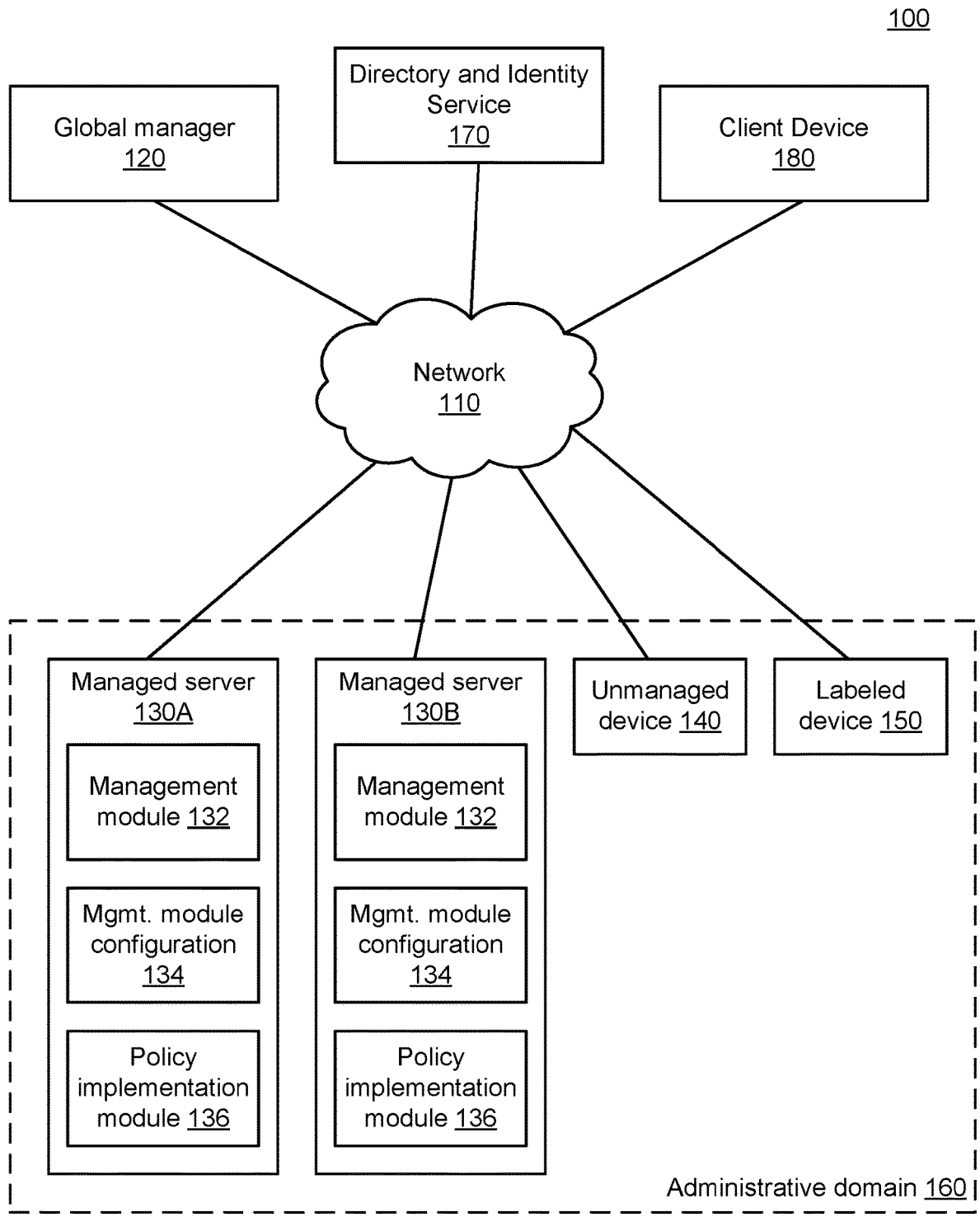
FIG. 1A is a high-level block diagram illustrating an environment for managing servers (physical or virtual) of an administrative domain, according to one embodiment.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

FIG. 1 is a high-level block diagram illustrating an environment 100 for managing servers (physical or virtual) of an administrative domain 160, according to one embodiment. The administrative domain 160 can correspond to an enterprise such as, for example, a service provider, a corporation, a university, or a government agency. The environment 100 may be maintained by the enterprise itself or by a third party (e.g., a second enterprise) that helps the enterprise manage its servers 130. As shown, the environment 100 includes a network 110, a global manager 120, a directory and identity service 170, one or more client devices 180, multiple managed servers 130, one or more unmanaged devices 140, and one or more labeled devices 150. The global manager 120 receives user group definitions from the directory and identity service 170 and enforces policies that regulate communications between servers based on user groups.

The managed servers 130, the unmanaged device 140, and the labeled device 150 are associated with the administrative domain 160. For example, they are operated by the enterprise or by a third party (e.g., a public cloud service provider) on behalf of the enterprise. A server refers to a managed server, an unmanaged device, or a labeled device. While one global manager 120, one directory and identity service 170, one client device 180, two managed servers 130, one unmanaged device 140, and one labeled device 150 are shown in the embodiment depicted in FIG. 1 for clarity, other embodiments can have different numbers of global managers 120, managed servers 130, unmanaged devices 140, directory and identity services 170, client devices 180, and/or labeled devices 150. A server may provide a service that may be executed or invoked by other servers. For example, a server may provide a service by executing an application that may be executed by other servers. Example of an application executed on server that provides a service is an email server, collaboration software, database system, and so on.

In some instances, the administrative domain 160 may include one or more network domains. A network domain includes one or more network access points (e.g., managed servers 130, unmanaged devices 140, and labeled devices 150) registered with a domain controller server, which provides directory and identity services. The domain controller authenticates the identity of a user logging onto a network access point and assigns the network access point permissions corresponding to the identity. For example, the domain controller verifies identity through a username and password challenge, a physical or virtual security token, or some other authentication factor. The domain controller server may serve as the global manager 120 or may be a managed server 130 separate from the global manager 120.

The network 110 represents the communication pathway between the global manager 120, the managed servers 130, and the unmanaged devices 140. In one embodiment, the network 110 uses standard communications technologies and/or protocols and can include the Internet. In another embodiment, the entities on the network 110 can use custom and/or dedicated data communications technologies.

The client device 160 is a computing device used by a user for interacting with a managed server 130 or the global manager 120. The client device 160 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc.

A managed server 130 is a machine (physical or virtual) that implements an administrative domain-wide management policy 330 (shown in FIG. 3A). In one embodiment, a server is a user-space instance of a virtual server (sometimes referred to as a container, virtualization engine, virtual private server, or jail) according to operating system-level virtualization, which is a server virtualization method where the kernel of an operating system enables multiple isolated user-space instances, instead of only one instance. If a managed server 130 is a physical machine, then the managed server 130 is a computer or set of computers. If a managed server 130 is a virtual machine, then the managed server 130 executes on a computer or set of computers. The administrative domain-wide management policy 330 specifies whether and/or how entities associated with the administrative domain 160 are allowed to access (or be accessed by) other entities or otherwise consume (or provide) services. For example, the administrative domain-wide management policy 330 specifies security or resource usage. A security policy might specify access control, secure connectivity, disk encryption, and/or control of executable processes, while a resource-usage policy might specify usage of the administrative domain's computing resources (e.g., disks, peripherals, and/or bandwidth).

The global manager 120 labels managed servers 130 (or any labeled actors (e.g., labeled devices 150)) according to an identity of a user controlling the managed server 130, for example, a user currently logged in to the managed server 130. This user identity-based labeling leverages groups from the directory and identity service 170 to control which services a user can access through a managed server 130. Because the security policy is enforced at both ends, the management module 132 of the managed server 130 blocks communications from the managed server 130 that are sent to other servers for accessing an unauthorized service using the managed server 130.

Server labeling based on a user group provides the ability to control which services are accessible to by a user of the user group. The global manager 120 receives user group definitions from the directory and identity service 170. In an embodiment, the user group definitions comprise a mapping from users to user group identities. The global manager 120 maintains the mapping between users and user group identities. From the mapping, the global manager 120 may assign a label with the "User Group" dimension to the managed server 130.

The global manager 120 also accesses authorization privileges from the directory and identity service and generates rules for managed servers 130 having a "User Group" label according to the authorization privileges. In an embodiment, the global manager receives privilege information from a user, for example, a system administrator. The privilege information may specify services that are permitted to users of a particular user group. The policy implementation module 136 of a managed server checks who the user is at login and downloads the permitted whitelist servers with which the managed server allows the user to communicate (e.g., in the form of management instructions) from the global manager 120 to the policy implementation module 136, which enforces the policy using the management module 132. If a user is part of multiple user groups, the managed server 130 is assigned multiple label values for the "User Group" label dimension. In a whitelist-based rules model, the user logged in to the managed server 130 accordingly is granted access to any service, actor, or process that is authorized by rules for at least one of the user groups associated with the managed server 130.

The directory and identity service 170 stores information associated with users, for example, user identifiers, authentication information for users, roles and privileges for users, and so on. The directory and identity service 170 also stores user groups representing sets of users. For example, if a network domain is associated with an organization, the directory and identity service 170 may store various user groups based on the organization, for example, various teams of users including sales teams, marketing teams, human relations (HR) teams, development teams, quality assurance (QA) teams, and so on. Users from a particular team typically use specific services provided by servers of a network domain. For example, users from an HR team may use applications managing HR information whereas users from a development team may use tools related to development. An example of a directory and identity service is MICROSOFT's ACTIVE DIRECTORY.

A managed server 130 includes a management module 132, a management module configuration 134, and a policy implementation module 136. The management module 132 implements the administrative domain-wide management policy 330. For example, in the case of security, the management module 132 can be a low-level network or security engine such as an operating system-level firewall, an Internet Protocol security (IPsec) engine, or a network traffic filtering engine (e.g., based on the Windows Filtering Platform (WFP) development platform). In the case of resource usage, the management module 132 can be a disk-usage engine or a peripheral-usage engine.

The management module configuration 134 affects the operation of the management module 132. For example, in the case of security, the management module configuration 134 can be access control rules applied by a firewall, secure connectivity policies applied by an IPsec engine (e.g., embodied as iptables entries and ipset entries in the Linux operating system), or filtering rules for filtering communications sent by the managed servers to other servers.

The policy implementation module 136 generates the management module configuration 134 based on a) management instructions received from the global manager 120 and b) the state of the managed server 130. The management instructions are generated based, in part, on the administrative domain-wide management policy 330. The management module configuration 134 generated by the policy implementation module 136 implements that administrative domain-wide management policy 330 (to the extent that the policy concerns the managed server 130). For example, the policy implementation module 136 may generate management instructions that block unauthorized communications, for example communications to servers executing services to which access is not permitted to the user group currently assigned to the managed server 130. The policy implementation module 136 also monitors the local state of the managed server 130 and sends local state information to the global manager 120. For example, if a new user logs into the managed server causing the user groups assigned to the managed server to change, the policy implementation module 136 sends the change in information to the global manager 120.

The global manager 120 is a computer (or set of computers) that generates management instructions for managed servers 130 and sends the generated management instructions to the servers. The management instructions are generated based on a) the state of the administrative domain's computer network infrastructure (the "administrative domain state 320") and b) an administrative domain-wide management policy 330. The administrative domain state 320 includes descriptions of managed servers 130 and (optionally) descriptions of unmanaged devices 140 or labeled devices 150. The global manager 120 also processes local state information received from managed servers 130. For example, the global manager 120 receives information indicating a local state change of a managed server as a result of a new user logging in to a managed server.

The administrative domain-wide management policy 330 is based on a logical management model that can reference managed servers 130 based on their high-level characteristics, referred to herein as "labels." A label is a pair that includes a "dimension" (a high-level characteristic) and a "value" (the value of that high-level characteristic). A dimension is also referred to herein as a label dimension or a server dimension. A management policy constructed in this multi-dimensional space is more expressive than a management policy constructed according to a single-characteristic network/IP address-based policy model. In particular, expressing management policy using the higher-level abstractions of "labels" enables people to better understand, visualize, and modify management policy.

The logical management model (e.g., the number and types of dimensions available and those dimensions' possible values) is configurable. In one embodiment, the logical management model includes the following dimensions and values, as shown in Table 1:

TABLE 1

Example of logical management model

| Dimension | Meaning (M), Values (V) |
| --- | --- |
| Role | M: The role of the managed server within the administrative domain.<br>V: web, API, database |

TABLE 1-continued

Example of logical management model

| Dimension | Meaning (M), Values (V) |
|---|---|
| Environment | M: The lifecycle stage of the managed server.<br>V: production, staging, development |
| Application | M: The logical application (higher-level grouping of managed servers) to which the managed server belongs.<br>V: trading, human resources |
| Line of Business | M: The business unit to which the managed server belongs.<br>V: marketing, engineering |
| Location | M: The location of the managed server. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the managed server.<br>V: Engineers, Contractors, Managers, System Administrators, Sales, Executive, Developers, Testers, Marketing, HR |

The logical management model enables multiple managed servers 130 to be grouped together by specifying one or more labels (referred to herein as a "label set") that describe all of the managed servers 130 in the group. A label set includes either zero values or one value for a dimension in the logical management model. A label set need not include labels for all dimensions in the logical management model. In this way, the logical management model enables the segmentation and separation of an administrative domain's managed servers 130 and the creation of arbitrary groupings of managed servers 130. The logical management model also allows for a single managed server 130 to exist in multiple overlapping sets (i.e., multiple overlapping groups of managed servers). The logical management model does not limit the single managed server 130 to existing in a hierarchy of nested sets.

For example, in the case of security, segmentation can be used with access control policies to define groups of managed servers 130 that are subject to particular policies. Similarly, segmentation can be used with secure connectivity policies to define groups of managed servers 130 and the policies that apply to intra-group communications and inter-group communications.

In an embodiment, segmentation is performed on a per-user basis. Accordingly, the global manager 120 assigns the managed server 130 a first label set when a first user is logged on, a second label set when a second user in a different user group from the first user is logged on, and a default label set when no user (or a user having no special permissions) is logged on. The first and second label sets include labels having different values in the "User Group" dimension. The default label set may either lack a label having a "User Group" dimension or may include a label having, e.g., a "Default" or "Null" value for the "User Group" dimension. A user may be part of multiple user groups (e.g., a managers user group and an engineers user group). As a result, a managed server 130 may be assigned multiple values for the "User Group" dimension of a label. Alternatively or additionally, a managed server 130 is assigned multiple labels each having different values for the "User Group" dimension. In contrast, a managed server 130 (or other labeled actor) may have only one value for other dimensions, such as "Location," "Environment," "Application," and "Role."

Each managed server 130 in the environment 100 implements the administrative domain-wide management policy 330 (to the extent that the policy concerns the managed server 130). As a result, the administrative domain-wide management policy 330 is applied in a distributed fashion throughout the administrative domain 160, and there are no choke points. Also, the administrative domain-wide management policy 330 is applied at the logical level independent of the administrative domain's physical network topology and network addressing schemes.

An unmanaged device 140 is a computer (or set of computers) that does not include a policy implementation module 136. An unmanaged device 140 does not implement the administrative domain-wide management policy 330. However, interaction between a managed server 130 and an unmanaged device 140 can be subject to the administrative domain-wide management policy 330 (as implemented by the managed server 130). An example of an unmanaged device 140 is a device used by a person to authenticate himself to the administrative domain 160 (e.g., a notebook or desktop computer, a tablet computer, or a mobile phone).

A labeled device 150 is an unmanaged device 140 that the administrative domain-wide management policy 330 refers to by one or more labels ("a label set"). Since label sets refer to high-level characteristics of the labeled device 150, label sets facilitate application of policies controlling communication between a labeled device 150 and a managed server 130. When the global manager 120 labels an unmanaged device 140, the device becomes a labeled device 150. Like unmanaged devices 140 that are unlabeled, labeled devices 150 may be servers, client devices, or other computers, and may be physical computers or virtual computers.

The administrative domain-wide management policy 330 includes rules regulating actors within the administrative domain 160. Rules specify label sets for improved generality and to facilitate intuitive review by an administrator. Such a rule applies to an additional labeled device 150 or managed servers 130 introduced to the administrative domain 160 without modification of the rule. For example a rule may specify that a managed server or device having the "User Group" label value "DB Administrator" is allowed to communicate with a server S1 providing a "Database" service. If a user from the "DB Administrator" user group logs into a managed server 130, the "User Group" label of the managed server 130 is assigned the value "DB Administrator" and the managed server is able to communicate with the server S1. If the user from the "DB Administrator" logs out and another user who is not in the "Sales" user group logs in, the "User Group" label changes to "Sales" and the managed server 130 is unable to communicate with the server S1. Accordingly, labelling of servers facilitates specification of rules using label sets. Such rules are less computationally complex to maintain, so associating an unmanaged device 140 with a label set (thereby transforming it into a labeled device 150) beneficially facilitates management of the administrative domain 160.

Figure 3:
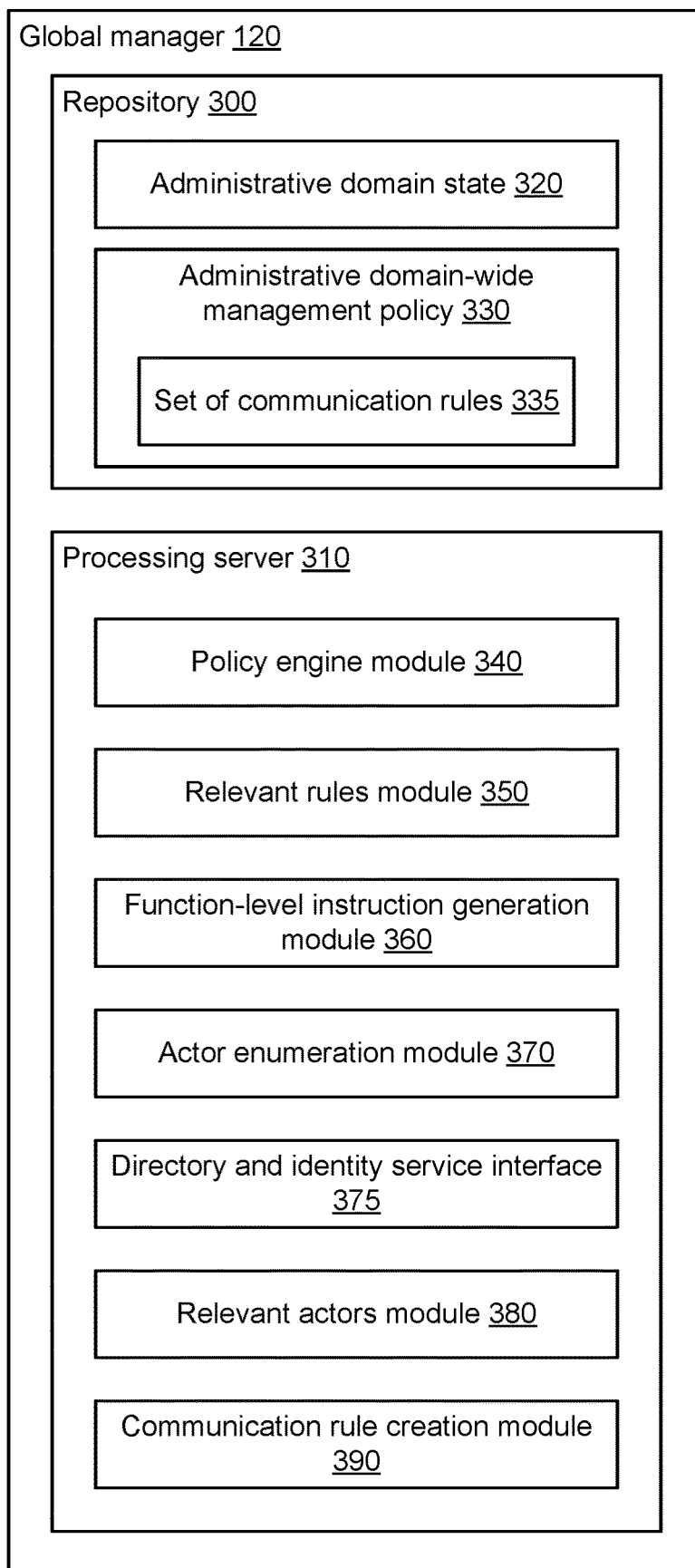
FIG. 3 is a high-level block diagram illustrating a detailed view of a global manager, according to one embodiment.

The global manager 120, the administrative domain state 320, and the administrative domain-wide management policy 330 are further described below with reference to FIG. 3.

Figure 1B:
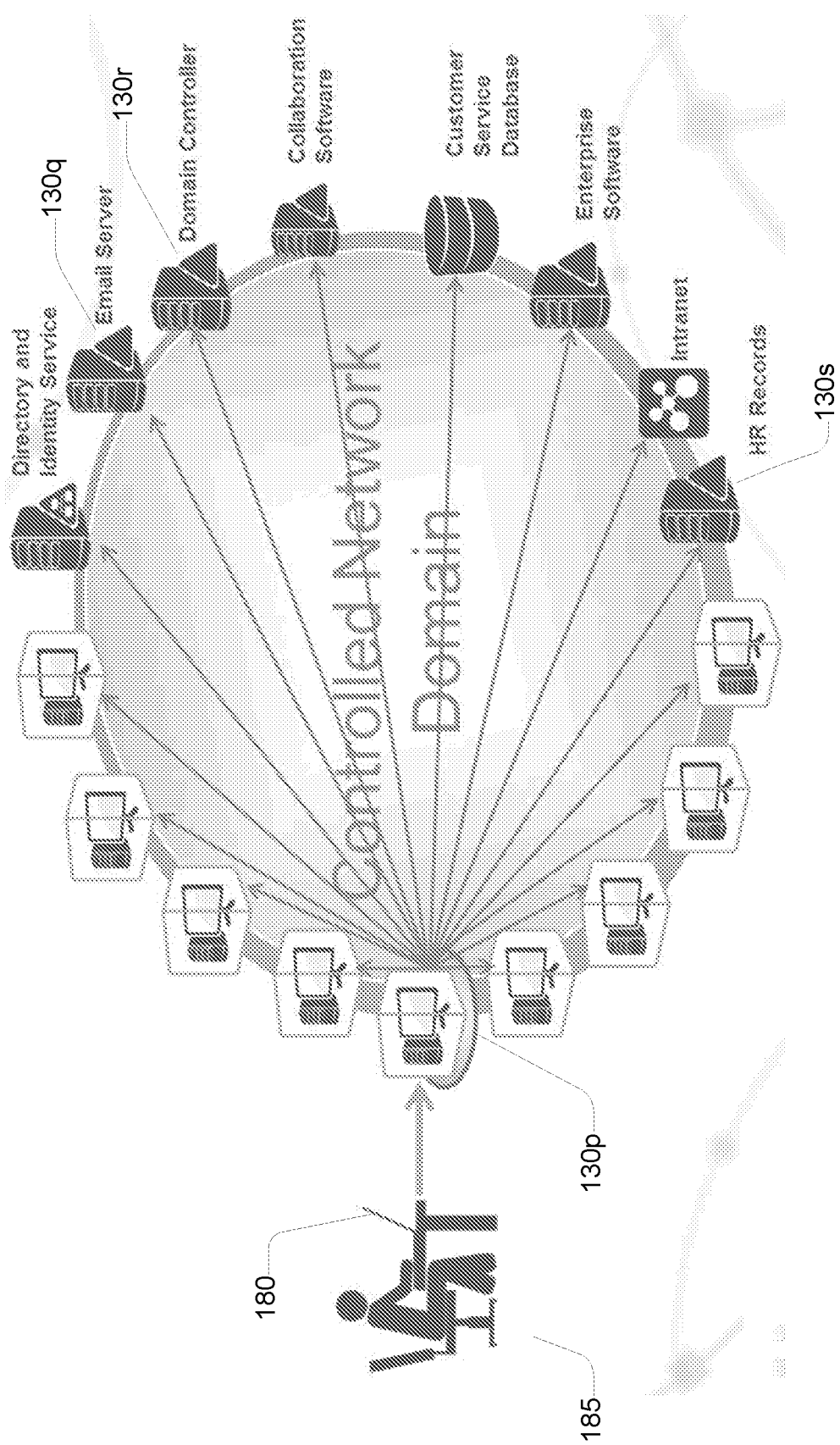
FIG. 1B illustrates a user connecting via a client device with a managed server to execute applications providing services, according to one embodiment.

FIG. 1B illustrates a user 185 connecting via a client device 180 with a managed server 130p to execute applications providing services hosted by servers of the network domain, according to one embodiment. In an embodiment, one or more managed servers implement virtual desktop instances for use by users of the network domain. A managed server can be a laptop, a desktop, a mobile device, a virtual application (for example, Citrix XenApps) or a virtual desktop (for example, XenDesktop). Some servers provide services, for example, server 130q provides email service by executing an email server, server 130r is a domain controller, and server 130s is executing an HR records application. As shown in FIG. 1B, the managed server 130p can potentially communicate with all servers of the network. However, embodiments restrict communications from the server 130p to other servers based on user group information associated with the user 185. The global manager 120 receives user group definitions from the directory and identity service 170. The global manager 120 generates rules that restrict communications from server 130p to other servers based on user groups of the user 185 logged into the server 130p.

Figure 1C:
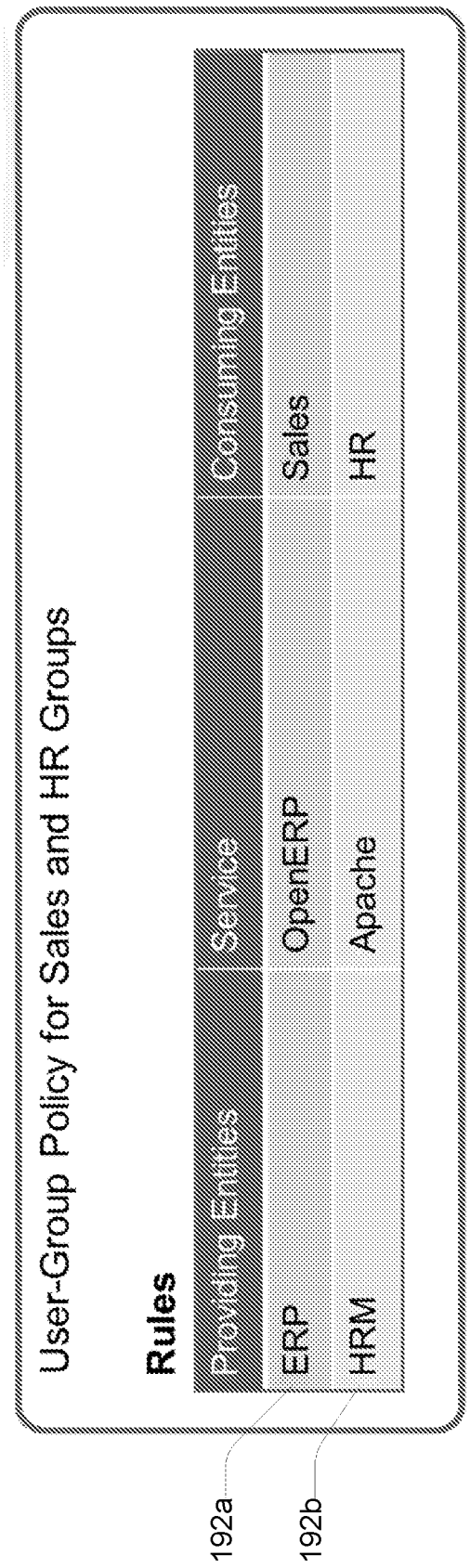
FIG. 1C illustrates example rules generated by the global manager, according to an embodiment.

FIG. 1C illustrates example rules generated by the global manager, according to an embodiment. The rule 192a authorizes managed servers 130 (or other labeled actors) with the label "ERP" to provide the service "OpenERP" to managed servers 130 with "Sales" value for the "User Group" label dimension. The rule 192a authorizes servers (or labeled actors) with the label "HRM" to provide the service "Apache" to managed servers 130 with "HR" value for the "User Group" label dimension. As another example, the rules may authorize members of a user group to access only services associated with specified port/protocol pairs.

The global manager 120 enforces policies based of generated rules. For example, a policy based on rule 192b limits communications from the server 130p to servers providing services with the label "HRM" if the user 185 logged into server 130p has "Sales" value for the "User Group" label dimension. Assume that the servers 130q, 130r and 130s provide services with the label "HRM".

Figure 1D:
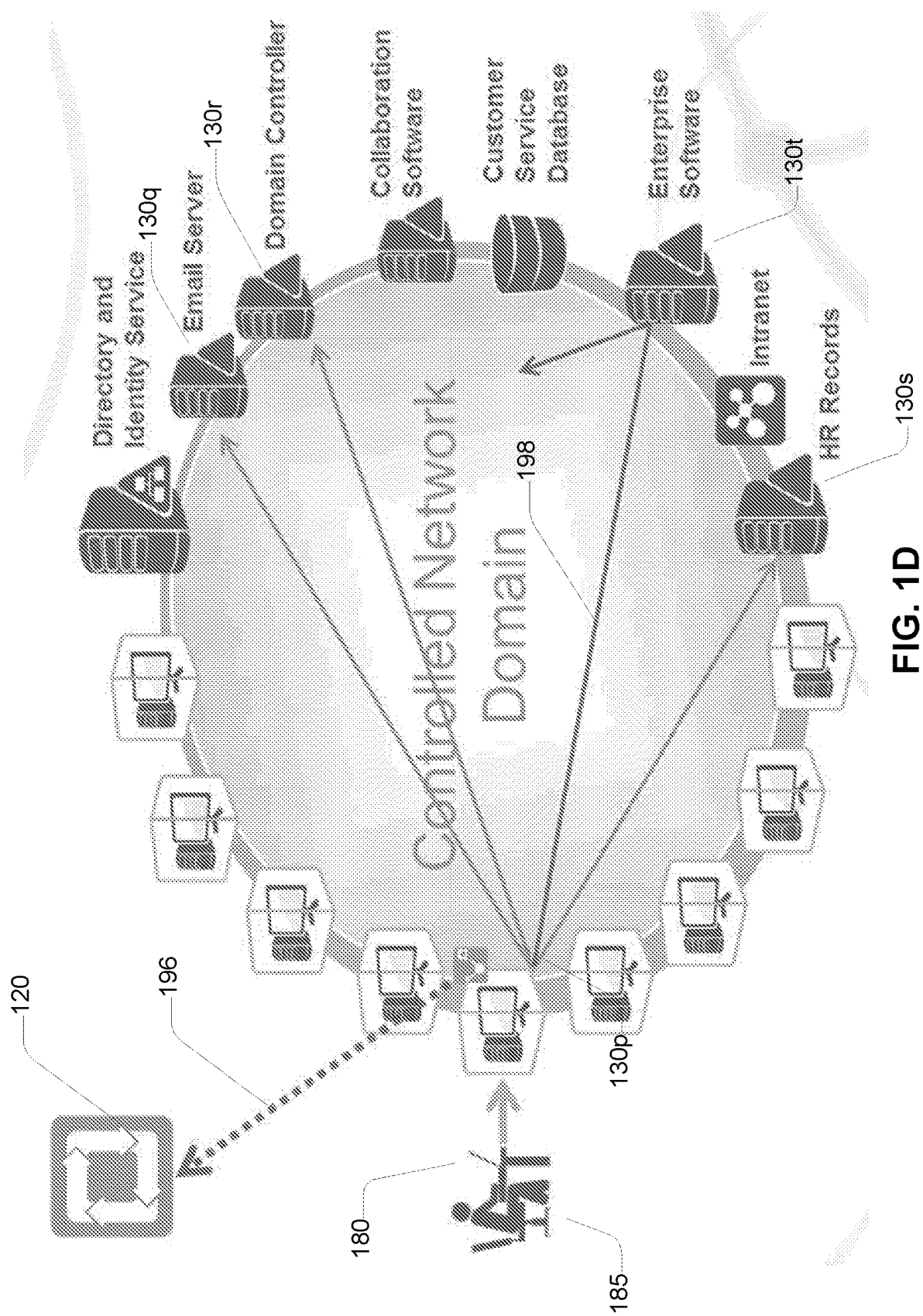
FIG. 1D illustrates enforcement of a policy for managing security of services based on user groups, according to an embodiment

FIG. 1D illustrates enforcement of the policy based on example rules 192 for managing security of services of the network domain, according to an embodiment. As shown in FIG. 1D, the policy allows server 130p to communicate with servers 130q, 130r and 130s if the user 185 has "Sales" value for the "User Group" label dimension. If the server 130p attempts to communicate with a server outside the set of servers permitted by the rules 192, the communication 198 is blocked. Furthermore, an alert 196 may be sent to the global manager 120 indicating that the server 130p attempted an unauthorized communication, thereby allowing a system administrator to take appropriate action.

Accordingly, communications between servers are regulated based on the rules 192 thereby restricting the server 130p to communicate with only other servers that provide services that the user currently logged in to server 130p is permitted to access. As a result, users are prevented from connecting to unauthorized applications. According to an embodiment, a user is not allowed to request login for an application that the user is not permitted to access. Limiting the user access significantly reduces the surface area of attack available to malicious actors who gain access to the internal network by, e.g., compromising a user account. The security is provided based on a user's identity, and without any changes to the underlying network.

Even though the figures illustrate a single user logging into the managed server 130p, the embodiments are not limited to providing access to a managed server with a single user logged in. The managed server 130 allows multiple users to log in at the same time. The administrative domain wide policy allows each user to access the services based on the user groups that the user is part of.

Computer

Figure 2:
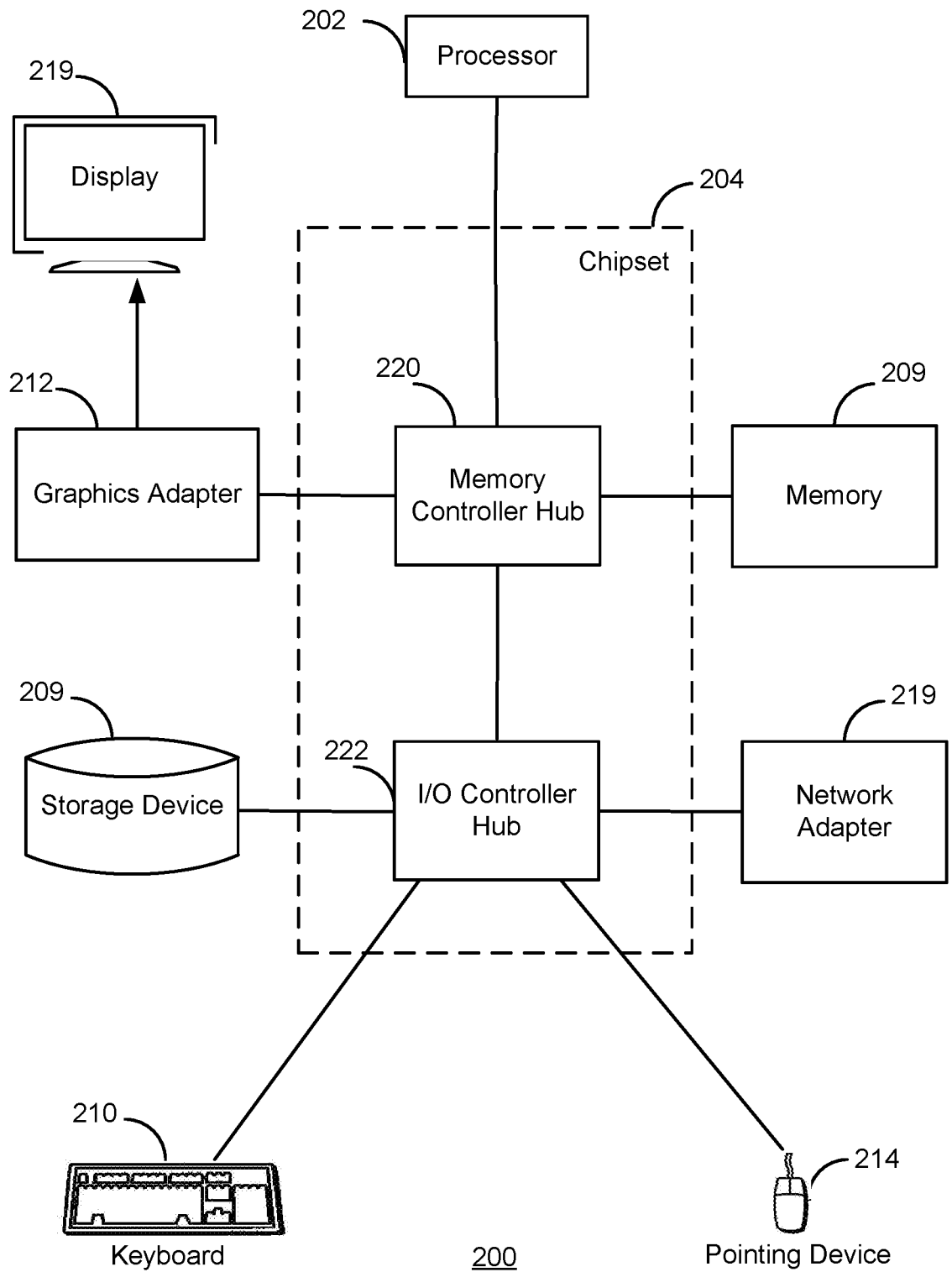
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the global manager 120 and/or the managed server 130 can be formed of multiple blade servers and lack a display device, keyboard, and other components, while an unmanaged device 140 or a labeled device 150 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Global Manager

FIG. 3A is a high-level block diagram illustrating a detailed view of a global manager 120, according to one embodiment. The global manager 120 includes a repository 300 and a processing server 310. The repository 300 is a computer (or set of computers) that stores the administrative domain state 320 and the administrative domain-wide management policy 330. In one embodiment, the repository 300 includes a server that provides the processing server 310 access to the administrative domain state 320 and the management policy 330 in response to requests. The global manager 120 receives user group definitions from the directory and identity service 170 and generates rules for regulating communications based on user groups.

Administrative Domain State

The administrative domain state 320 includes descriptions of managed servers 130 and (optionally) descriptions of other network devices including unmanaged devices 140, and/or labeled devices 150. A description of a managed server 130 includes, for example, a unique identifier (UID), an online/offline indicator, one or more configured characteristics (optional), network exposure information, service information, and one or more labels that describe the managed server 130 (a label set). The label set may include one or more labels that identify a user group of a user of the managed server 130.

The UID uniquely identifies the managed server 130. The online/offline indicator indicates whether the managed server 130 is online or offline. A "configured characteristic" stores a value associated with the managed server 130 and can be any type of information (e.g., an indication of which operating system is running on the managed server). A configured characteristic is used in conjunction with a rule's condition portion (described below).

The description of a managed server 130 includes service information describing services on a managed server 130. The service information includes, for example, process information and/or package information. Process information includes, for example, names of processes that the managed server 130 is running, which network ports and network interfaces those processes are listening on, which users initiated those processes, configurations of those processes, command-line launch arguments of those processes, and dependencies of those processes (e.g., shared objects to which those processes link). Package information includes, for example, which packages (executables, libraries, or other components) are installed on the managed server 130, the versions of those packages, the configurations of those packages, and the hash values of those packages.

A description of an unmanaged device 140 includes, for example, network exposure information (e.g., the IP address of the unmanaged device 140 and an identifier of the BRN (bidirectionally-reachable network) to which the unmanaged device 140 is connected) or a unique identifier (UID). An unmanaged device 140 is part of an "unmanaged device group" (UDG). A UDG includes one or more unmanaged devices 140.

The description of a labeled device 150 may include network exposure information, a UID of the labeled device 150, and/or one or more UDGs including the labeled device 150. Similar to a managed server 130, the description of a labeled device 150 includes a label set describing the high-level characteristics of the labeled device 150. The label set may include a label identifying services provided by the labeled device 150.

Descriptions of managed servers 130, unmanaged devices 140, and labeled devices 150 can be loaded into the administrative domain state 320 in various ways, such as by interacting with the global manager 120 via a graphical user interface (GUI) or an application programming interface (API). Descriptions of managed servers 130 can also be loaded into the administrative domain state 320 based on local status information received from managed servers (described below).

Regarding labels, the global manager 120 may assign (or reassign) a value to a label dimension in many ways. For example, the assignment/setting can be performed using a deployment and configuration tool as part of provisioning a managed server 130. The label identifying a user group of the user of the managed server 130 is updated whenever the user log out or disconnects from the managed server and whenever a new user logs in or connects with the managed server 130.

Administrative Domain-Wide Management Policy

The administrative domain-wide management policy 330 includes one or more rules. A "rule" specifies a relationship between one or more providers of a service and one or more consumers of that service. The relationship is subjected to a "rule function", which is the practical effect of the rule. For example, in the case of security, the rule function could be access control, secure connectivity, disk encryption, or control of executable processes.

A rule with an access control function specifies whether a consumer may use a provider's service. In one embodiment, the access control function uses a pure "whitelist" model, which means that only the allowable relationships are expressed, and all other relationships are blocked by default. A rule with a secure connectivity function specifies over what secure channels (e.g., encrypted network sessions using point-to-point data encryption) a consumer may use a provider's service. For example, a rule with a secure connectivity function could specify that usage of a provider's services must be encrypted when the provider is located in the US and the consumer is located in the EU. A rule may regulate resource usage, for example, disk-usage or peripheral-usage.

A "service" is a process executing on a specific network port using a specific network protocol. A service of a rule within the management policy 330 is specified by a port/protocol pair and (optionally) additional qualifications, such as process information and/or package information (described above with respect to a description of a managed server 130 within the administrative domain state 320). The one or more providers of the service and the one or more consumers (i.e., users) of the service are managed servers 130, unmanaged devices 140, and/or labeled devices.

In one embodiment, a rule is represented within the administrative domain-wide management policy 330 using a set of information that includes a rule function portion, a service portion, a provided-by portion, a used-by portion, and an optional rule condition portion. The rule function portion describes the practical effect of the rule and can be associated with one or more settings (function profiles). The service portion describes the service to which the rule applies. If the service portion indicates "All", then the rule applies to all services.

The provided-by (PB) portion describes which managed servers 130, unmanaged devices 140, and/or labeled devices 150 can provide the service (i.e., who the "providers" are). If the PB portion indicates "Anybody", then any actor (e.g., any managed server 130, unmanaged devices 140, and/or labeled devices 150) can provide the service. If the PB portion indicates "Any labeled device", then any managed server 130, or labeled device 150 can provide the service. Similarly, if the PB portion indicates "Any managed server", then the any managed server 130 can provide the service regardless of the managed server's label. The used-by (UB) portion describes which managed servers 130, unmanaged devices 140, and/or labeled devices 150 can use the service (i.e., who the "consumers" are). Similar to the PB portion, the UB portion can also indicate "Anybody", "Any labeled device", or "Any managed server."

Within the PB portion and the UB portion, a managed server 130 or labeled device 150 is specified by using a label set (i.e., one or more labels that describe the managed server) or a UID. The ability to specify managed servers 130, and/or or labeled devices 150 using label sets stems from the logical management model, which references managed servers based on their dimensions and values (labels). The PB portion of a rule and/or the UB portion of a rule can include multiple items, including label sets (to specify managed servers 130, and/or labeled devices 150), managed server UIDs, and/or UDG UIDs.

The following administrative domain-wide management policy 330, which is a security policy that specifies access control based on user group:

Rule
    Function: Access Control
    Service: PostgreSQL
    PB: <Role, Database>
    UB: <User Group, DB Administrators>

The rule above refers to a service simply as "PostgreSQL" for clarity. Remember that a service is a process and is specified by a port/protocol pair and (optionally) additional qualifications, such as process information and/or package information (described above with respect to a description of a managed server 130 within the administrative domain state 320). The above rule allows a managed server to connect to PostgreSQL on a database server. Specifically, the allowance of a connection is specified by "Access Control" in the Function portion. The "database server" is specified by "<Role, Database>" (a label set that includes only one label) in the PB portion. The UB portion "<User Group, DB Administrators>" specifies that the service is accessible to users belonging to the user group "DB Administrators." Accordingly, a managed server 130 can connect to a service offering the PostgreSQL service if the user connected to the managed server 130 belongs to the user group "DB Administrators."

Communication Rules

An administrative domain-wide management policy 330 of the global manager 120 may include a set of communication rules 335. In an embodiment, the communication rules are used to regulate communications between managed servers and servers providing services based on user groups. The set of communication rules 335 contains one or more communication rules, which are rules that control communication between two actors of the administrative domain. Example rules in the set of communication rules 335 include rules having a rule function specifying permissible communications (referred to herein as "access control rules"), rules having a rule function mandating encryption of communication (referred to herein as "encryption rules"), and rules having a rule function regulating bandwidth-usage (referred to herein as "bandwidth rules").

Broadly, a communication rule authorizes communication between a first actor (e.g., a managed server 130) and a second actor (e.g., another managed server 130, an unmanaged device 140, a labeled device 150, or a device external to the administrative domain 180). A communication rule specifies a provided-by (PB) portion, a used-by (UB) portion, a service. For example, an access control rule specifies whether a consumer specified by the UB portion may use a service from a provider specified by the PB portion. In one embodiment, the access control rules are used in a pure "whitelist" model in which a consumer may access a service on a provider only if the set of access control rules 335 includes an access control rule with matching PB, UB, and service portions.

The policy implementation module 136 of a managed server 130 includes an alert generation module 430. The alert generation module 430 monitors communication (also referred to as "network traffic") between the managed server 130 and other actors (managed servers 130, unmanaged devices 140, labeled devices 150, or devices external to the administrative domain 160) for compliance with access control rules contained in the management module configuration 134. An example alert 198 is shown in FIG. 1D. The alert generation module 430 generates an alert in response to detecting a communication that does not comply with the access control rules (referred to as an "unauthorized communication") and sends the alert to the global manager 120. An unauthorized communication includes an attempt by a consumer to use a service provided by the managed server 130 as well as an attempt by the managed server 130 to use a service provided by another actor. For example, an attempt to send network traffic to or receive network traffic from a port associated with a service can be an unauthorized communication. In an embodiment where the access control rules serve as a whitelist of permissible activities, the management module 132 allows attempted communication that matches an access control rule and denies attempted communication that does not match an access control rule.

When the management module 132 denies or blocks communication to or from the managed server 130, the alert generation module 430 generates an alert. The alert describes the service, the provider of the service (e.g., using the UID or label set of the relevant actor), and the consumer of the service (e.g., using the UID or label set of the relevant actor) corresponding to the communication. The alert may contain relevant service information about the service as well as network exposure information about the provider and consumer. The alert may contain communication information that describes characteristics of the communication. Communication information may include timing, duration, frequency, protocol type, data size (e.g., total size, packet size), or data rate of the attempted communication. For example, the communication information differentiates between a single attempt to access a service and repeated attempts to access the service. Communication information may also describe routing information of communication such as source address, destination address, and path information (e.g., load balancers and NAT devices routing the unauthorized communication).

Processing Server

The processing server 310 generates management instructions for managed servers 130 and sends the generated management instructions to the servers. The management instructions configure the managed server 130 to provide access to users logged into the managed server 130 according to the administrative domain wide policy. Accordingly, the management instructions configure the managed server 130 to allow each user logged into the managed server 130 to access the services that are accessible to the user groups that the user belongs to. Accordingly, the configured managed server 130 blocks communications that are sent by a user logged into the managed server 130 if the communications attempt to access a service that is not accessible to the user groups of the user according to the administrative domain wide policy. In an embodiment, the management instructions are sent to a server that receives communications from users logged into another managed server, for example, by a server that provides a service. The server receiving the communications allows the communications if the communications are sent by a user allowed to access the service provided by the receiving server. The server receiving the communications blocks the communications if the communications are sent by a user not allowed to access the service provided by the receiving server.

In one embodiment, the global manager 120 receives from a server, information indicating that a first user logged into the server. The global manager 120 generates a first set of management instructions regulating communications between the first user and labeled entities related to user groups containing the first user. These label entities may be represented by server identifiers, for example, set of internet protocol (IP) addresses, or combinations of IP addresses and port addresses. The global manager 120 sends the first set of management instructions to the server. The global manager 120 also receives from the server, information indicating that a second user logged into the server. The global manager 120 generates a second set of management instructions regulating communications between the second user and labeled entities related to user groups containing the second user. The global manager 120 sends the second set of management instructions to the server. The two users may be logged in the server at the same time or the two users may login at different times. The above steps for generating the management instructions and sending them to the server provide the required access to each user independent of whether the two users are simultaneously logged in at the same time since different set of instructions is generated for each user.

The processing server 310 also processes local state information received from managed servers 130. The processing server 310 includes various modules such as a policy engine module 340, a relevant rules module 350, a function-level instruction generation module 360, an actor enumeration module 370, a directory and identity service interface 375, a relevant actors module 380, and a communication rule creation module 390. In one embodiment, the processing server 310 includes a computer (or set of computers) that communicates with the repository 300 and processes data (e.g., by executing the policy engine module 340, the relevant rules module 350, the function-level instruction generation module 360, the directory and identity service interface 375, and the communication rule creation module 390).

The relevant rules module 350 takes as input the administrative domain-wide management policy 330 and an indication of a particular managed server 130 (e.g., that server's UID), generates a set of rules that are relevant to that server, and outputs the set of rules. This is a filtering process by which the relevant rules module 350 examines the management policy 330 and extracts only the relevant rules for the given managed server 130.

A rule applies to a managed server 130 if (a) the PB portion of the rule and/or the UB portion of the rule specifies the managed server 130 and (b) the condition portion of the rule (if present) evaluates to "true" for that managed server (specifically, for the values of that managed server's configured characteristics and network exposure information). The end result (referred to herein as a "management policy perspective") is a collection of two sets of rules: rules where this managed server 130 provides a service and rules where this managed server 130 consumes a service.

The function-level instruction generation module 360 takes as input a set of rules (e.g., a management policy perspective generated by the relevant rules module 350), generates function-level instructions, and outputs the function-level instructions. The function-level instructions are later sent to a managed server 130 as part of the management instructions. A function-level instruction is similar to a rule in that each one includes a rule function portion, a service portion, a PB portion, and a UB portion. However, whereas a rule can include multiple items within its PB portion and/or UB portion (including label sets, addresses of network interfaces, managed server UIDs, and/or UDG UIDs), a function-level instruction includes only one item within its PB portion and only one item within its UB portion.

The actor enumeration module 370 takes as input a collection of descriptions of managed servers 130, labeled devices 150, and unmanaged device groups (UDGs) (e.g., the administrative domain state 320), generates representations of those descriptions of servers, devices, and UDGs in an enumerated form (referred to as "actor-sets"), and outputs the actor-sets. These actor-sets can then be used in conjunction with UB portions and PB portions of rules and scopes, which specify actors using managed server UIDs, UDG UIDs, and/or label sets. In one embodiment, the actor enumeration module 370 can also update actor-sets based on changes to the administrative domain state 320. A detected change of state in an unmanaged device 140 or labeled device 150 triggers generation of updated actor-sets. For example, an actor set representing all actors having a value of a "User Group" label may change as users from that user group log in or log out of manager servers.

The directory and identity service interface 375 interacts with the directory and identity service 170 to receive information describing user groups, for example, a mapping from users to user groups. In one embodiment, the directory and identity service interface 375 executes a script against a directory and identity service 170. As a result of execution of the script, the directory and identity service interface 375 imports the organization's directory and identity service groups into the global manager 120 via the API (application provider interface) of the global manager 120.

The relevant actors module 380 takes as input one or more actor-sets (e.g., the managed servers 130, labeled devices 150, the UDGs) within the administrative domain state 320 in enumerated form, and a set of rules (e.g., a management policy perspective), determines which actor-sets are relevant to those rules, and outputs only those actor-sets. This is a filtering process by which the relevant actors module 380 examines the actor-sets and extracts only the relevant actor-sets for the given set of rules. For example, if a rule allows communications between managed servers having a particular value of "User Group" label and servers providing a particular service, the relevant actors module 380 determines the sets of destination servers with which the managed server can communicate based on the user group of the user currently connected to the managed server and sends the set of destination servers to the managed server. The relevant actors module 380 performs the filtering by iterating through all of the input actor-sets, analyzing the PB portions and UB portions of the input rules to determine whether a particular actor-set is referenced by any of the rules' PB portions or UB portions. The end result (referred to herein as an "actor perspective") is a collection of actor-sets. The actor perspective is later sent to a managed server 130 as part of the management instructions. For example, the relevant actors module 380 may send to a managed sever, a set of servers providing services accessible to a user logged in to a managed server.

The policy engine module 340 generates management instructions for managed servers 130 and sends the generated management instructions to the servers. The policy engine module 340 generates the management instructions based on a) the administrative domain state 320 and b) the administrative domain-wide management policy 330.

In an embodiment, the global manager 120 generates management instructions associated with a service that is associated with one or more provider servers and one or more consumer servers. The global manager 120 generates a first set of instructions for the consumer server. The first set of instructions is configured to regulate communications between a user logged into the consumer server and one or more labeled entities. The labeled entities may represent a service or a server. The global manager 120 sends the first set of management instructions to the consumer server.

In an embodiment, the global manager 120 generates a second set of management instructions for the provider server. The second set of instructions is configured to regulate communications between the provider server and one or more other servers, wherein each of the one or more other servers has at least a user logged in who belongs to a user group allowed to access the service provided by the provider server. The global manager 120 sends the second set of instructions to the provider server.

The processing server 310 receives changes to the administrative domain state 320 and processes those changes. A change to the administrative domain state 320 is, for example, the addition, removal, or modification of a description of a managed server 130, or labeled device 150 (including the modification of label set or configured characteristics) or a description of an unmanaged device 140 or unmanaged device group, or a user logging in to a server or logging out of a server. In one embodiment, a change to the administrative domain state 320 originates in local state information received from a particular managed server 130, for example, change in the "User Group" associated with a managed server as a result of a user logging in or logging out of the particular managed server 130.

The global manager 120 generates management instructions such that each user on a server is associated with a set of instructions governing the access of the user to services that the user is permitted to access based on the user's membership in user groups. There is asymmetry in the management instructions that enforce the administrative domain wide policy on the consumer server as compared to the provider server of a service. The management instructions for the consumer server regulates communications between a user and a set of labeled entities (for example, represented as set of IP addresses and ports or IP/Port combination). The management instructions for the provider server regulates the communications between the provider server (for example, represented as a set of ports bound to the provider server) and one or more other servers (for example, represented as set of IP addresses).

In an embodiment, the managements instructions received by a server from the global manager 120 are stored in memory of the server, for example, a cache that allows fast access to the data. If the server receives an indication that the user logged out from the server, the server disables the instructions stored in memory. In an embodiment, the server may remove the instructions from the memory. In another embodiment, the server stores a flag indicating that the instructions corresponding to the user that logged out are disabled, If the server again receives an indication that the user logged back in (after the log out), the server enables the management instructions, thereby providing the user with access to the required services.

In an embodiment, the global manager 120 receives from a server, an indication of a user logging out of the server. The global manager 120 identifies all instructions sent to various servers providing access to the user to services permitted to users groups that the user belongs to. For example, instructions may have been sent to a consumer server to which the user logged in and to one or more provider servers. Note that each server may receive a different set of instructions. The global manager 120 sends a request to each of the identified server to disable the instructions that were previously sent to the server to provide access to the user to one or more services. For example, the global manager 120 may have sent a first set of instructions to the consumer server and a second set of instructions to a provider server. Responsive to determining that the user logged out of the server, the global manager sends a first request to the consumer server to disable the first set of management instructions and a second request to the provider server to disable the second set of management instructions. If the global manager 120 sent management instructions to multiple provider servers, the global manager 120 sends a request to disable the management instructions to each of the provider servers if the user logs out. In one embodiment, the request to disable the management instructions may cause the server to remove the management instructions. In another embodiment, the request to disable the set of instructions sets a flag that indicates that the instructions are disabled. However the instructions are kept stored, for example, in a cache. This allows the server to efficiently enable the instructions if the user logs back in after logging out.

In an embodiment, the global manager 120 receives an indication that an IP address of a server has changed. The IP address may be changed as a result of a computer (for example, a laptop) moving from one wireless provider to another wireless provider, For example, a user may move from a corporate building to a public hotspot and start using a virtual private network (VPN) thereby causing the laptop to use a different IP address. The global manager 120 updates the policies based on the change in the IP address. For example, if the IP address of a consumer server is changed, the global manager 120 informs relevant provider servers of services accessible to users logged in to the consumer server of the change of the IP address. Similarly, if the IP address of a provider server is changed, the global manager 120 updates the policies to reflect the IP address change and provides the updated policies to the consumer servers with users logged in who have access to the service provided by the provider server. The global manager 120 propagates policy changes that may be caused by any reason, for example, as a result of state changes of servers.

The communication rule creation module 390 is described below in the section entitled "Communication Rules."

Policy Implementation Module

Figure 4:
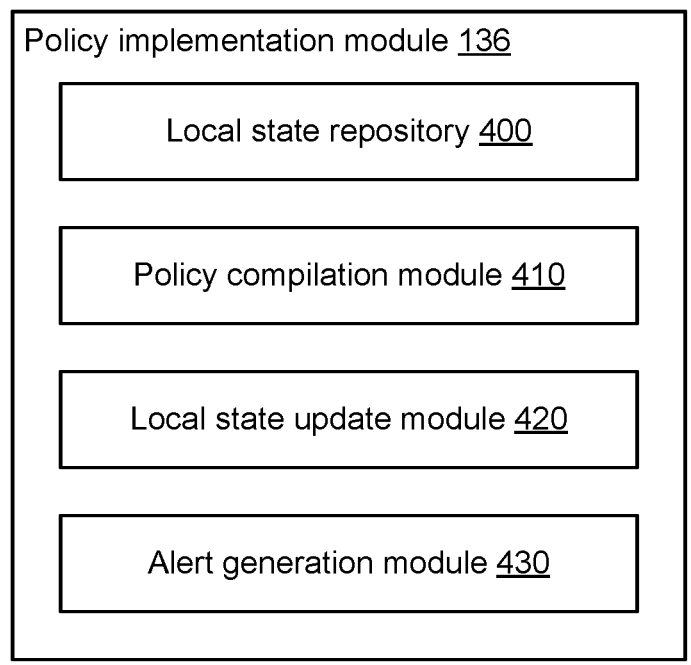
FIG. 4 is a high-level block diagram illustrating a detailed view of a policy implementation module of a managed server, according to one embodiment.

FIG. 4 is a high-level block diagram illustrating a detailed view of a policy implementation module 136 of a managed server 130, according to one embodiment. The policy implementation module 136 includes a local state repository 400, a policy compilation module 410, a local state update module 420, and an alert generation module 430. The local state repository 400 stores information regarding the local state of the managed server 130. In one embodiment, the local state repository 400 stores information regarding the managed server's operating system (OS), network exposure, services, and user currently logged in to the managed server.

The policy compilation module 410 takes as input management instructions and state of a managed server 130 and generates a management module configuration 134. For example, the management instructions are received from the global manager 120 and include function-level instructions (generated by the function-level instruction generation module 360) and relevant actor-sets (output by the relevant actors module 380). The state of the managed server 130 is retrieved from the local state repository 400.

In one embodiment, a managed server 130 monitors its outbound connections. The managed server 130 compares outbound network traffic to its internal process table to determine which processes in that table are establishing those outbound connections. The managed server 130 can enforce a rule that allows only certain processes (given a set of requirements, mentioned above as "process information") to establish an outbound connection. In an embodiment, managed server 130 can enforce a rule that allows a process to establish an outbound connection if certain label has a predetermined value, for example, if a label "User Group" has a specific value indicating the user logged in to the managed server belongs to the user group.

The local state update (LSU) module 420 monitors the local state of the managed server 130 and sends local state information to the global manager 120. For example, the LSU module 420 obtains user information describing an identity of a user (e.g., a user name) logging onto or logging off the managed server 130 as well as one or more user groups including the user. The LSU module 420 reports the identity to the global manager 120.

After the LSU module 420 sends the initial local state information to the global manager 120, the LSU module monitors changes to the local state. The LSU module monitors changes by, for example, polling (e.g., performing inspections periodically) or listening (e.g., subscribing to an event stream). In an embodiment, the LSU module 420 periodically monitors the user currently logged in to the managed server 130 to determine if the user changed. If the user logged into the managed server changed, the LSU module 420 sends an identifier for the new user to the global manager 120 as a change in the local state of the managed server 130.

The LSU module 420 compares recently-obtained local state information to information already stored in the local state repository 400. If the information matches, then the LSU module 420 takes no further action (until local state information is obtained again). If they differ, then the LSU module 420 stores the recently-obtained information in the local state repository 400 and notifies the global manager 120 of the change.

In one embodiment, the LSU module 420 sends changes to local state information to the global manager 120 in "diff" format, which describes differences between the local state information that was previously stored in the local state repository 400 (and, therefore, previously sent to the global manager 120) and the recently-obtained local state information. For example, the diff format specifies a type of local state information (e.g., operating system) and a new value for that information type. In another embodiment, the LSU module 420 sends the entire contents of the local state repository 400 to the global manager 120.

Process for Managing Security of Services Based on User Groups

Figure 5:
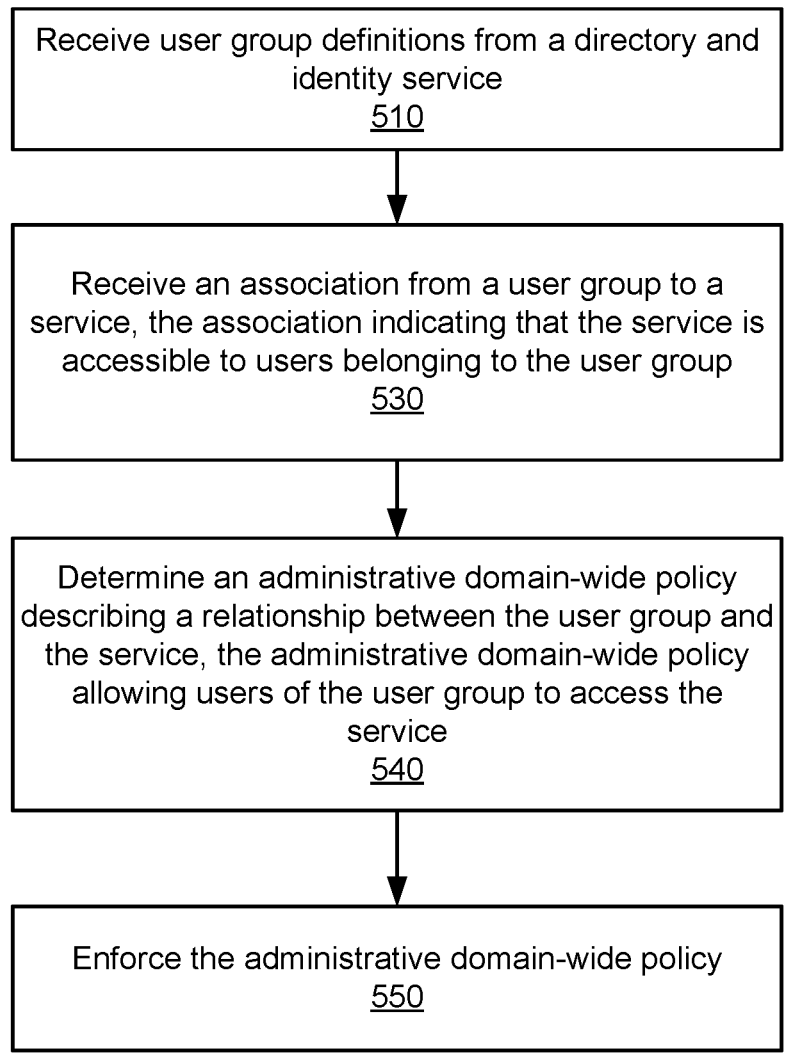
FIG. 5 is a flowchart illustrating a method of managing security of services executing on servers based on user groups, according to one embodiment.

FIG. 5 is a flowchart illustrating a method 500 of managing security of services executing on devices based on user groups, according to one embodiment. Other embodiments can perform the steps in different orders and can include different and/or additional steps. In addition, some or all of the steps can be performed by entities other than those shown in FIG. 1.

The directory and identity service interface 375 receives 510 information describing user groups, for example, user group definitions from a directory and identity service 150. The user group definitions specify identities of users that belong to specific user groups. In an embodiment, the directory and identity service interface 375 synchronizes with the directory and identity service 150 periodically, for example, every few minutes to get user group definitions.

In an embodiment, the global manager 120 associates managed servers with user groups based on user login information received from the managed servers. For example, if a user belonging to a "sales" user group logs in to the managed server 130p, the managed server 130p is associated with a "Sales Group" user group. In an embodiment, the global manager 120 updates the label sets corresponding to the managed servers based on user groups containing users that login to the managed servers. The global manager 120 stores the updated label sets in the repository 300. Further details of the step 520 are provided in FIG. 6.

The global manager 120 further receives an association from a particular user group to a set of labeled entities. A labeled entity may be a service or a server. The association indicates that the services or servers represented by the labeled entities from the set are accessible to users belonging to the particular user group. As an example, a system administrator may specify a high-level policy stating that "HR WEB" (a service) can be used by "HR Users" (a user group), thereby associating the "HR Users" user group with the service "HR WEB." In an embodiment, the association may be specified by a system administrator via a client device 185.

The global manager 120 determines 540 an administrative domain-wide policy describing a relationship between the user group and the service. The administrative domain-wide policy allows users of the user group to access the service. In an embodiment, the administrative domain-wide policy includes rules that specify the relationship between the user group and the service. The administrative domain-wide policy may include multiple rules, each rule relating user groups with services. Accordingly, if a user logged in to a managed server belongs to multiple user groups, the administrative domain-wide policy provides the user with access to all the services related to the users groups associated with the user. Accordingly, the administrative domain-wide policy allows the managed server of the user to communicate with all other servers that provide services accessible to the user groups of the user and blocks the communications otherwise. Multiple users may log into the same managed server 130. The global manager 120 enforces an administrative domain-wide policy that regulates communications for multiple users logged into the same managed server 130.

In one embodiment, the communication rule creation module 390 of the global manager 120 generates a rule that allows communications from a managed server having a current user associated with the particular user group with servers providing the particular service. For example, the generated rule may include a provided by portion that specifies servers that provide the particular service, for example, the "HR WEB" service. The generated rule further includes a used by portion that specifies a label identifying the particular user group, for example, a label "User Group" having the "HR Users" value. The rule is included in the administrative domain-wide policy. There may be multiple rules includes in the administrative domain-wide policy, each regulating communications between source servers and destination servers, the destination server providing a service and the source server allowing users to access the service.

The global manager 120 enforces 550 an administrative domain-wide policy based on the generated rule. The administrative domain-wide policy permits communications based on associations created between users groups and services accessible to the user groups. Accordingly, the administrative domain-wide policy blocks communications between a managed server and a server providing a service if the user currently logged into the managed server does not belong to any user group that is allowed access to the service.

Figure 6:
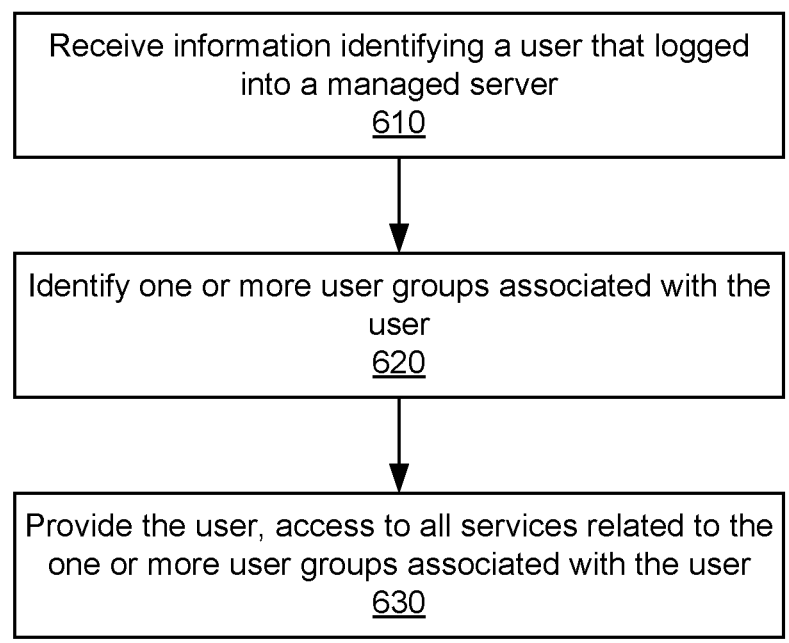
FIG. 6 is a flowchart illustrating details of the step for enforcing the administrative domain-wide policy, according to one embodiment.

FIG. 6 is a flowchart illustrating details of the step 550 for enforcing the administrative domain-wide policy, according to one embodiment. Other embodiments can perform the steps in different orders and can include different and/or additional steps. In addition, some or all of the steps can be performed by entities other than those shown in FIG. 1.

A managed server 130 receives a user login request from a client device 185. If the user login request provides the required authentication, the managed server 130 allows the user to create a session. The managed server 130 provides the user login information to the global manager 120. For example, the managed server 130 provides information to the global manager 120 indicating that the state of the managed server 130 changed as a result of a user logging into the managed server. The managed server 130 further provides the global manager 120 a user identity of the user that logged into the managed server 130.

The administrative domain-wide policy may specify a relationship with a server or with the service. The administrative domain-wide policy may include rules that regulate communications from source servers to destination servers. For example, the destination server provides a service and the source server allows a user to access the service. One or both of the source server and the destination server can be managed servers. Furthermore, either one of the source server or the destination server may regulate communications based on the policy. For example, the source server receives a list of all destination servers providing the services accessible to the user currently logged in to the source server and allows communications directed to the destination servers belonging to the approved list of destinations servers and blocks communications to destination servers that are not listed. Similarly, the destination server may provide a service accessible to a set of user groups. The destination server receives a list of all source servers used by users belonging to users groups from the set of user groups The destination server allows communications from source servers belonging to the list and blocks communications from source servers outside the approved list of source servers.

The global manager 120 receives 610 an indication of a user logging in to the managed server 130. The global manager 120 also receives a user identity for the user that logged into the managed server 130. The global manager 120 identifies 620 one or more user groups associated with the user. There may be a plurality of user groups that the user belongs to. The administrative domain wide policy may associate each of the identified users groups with one or more services. The administrative domain wide policy provides 630 the user with access to all services accessible to users groups that the user belongs to.

Figure 7:
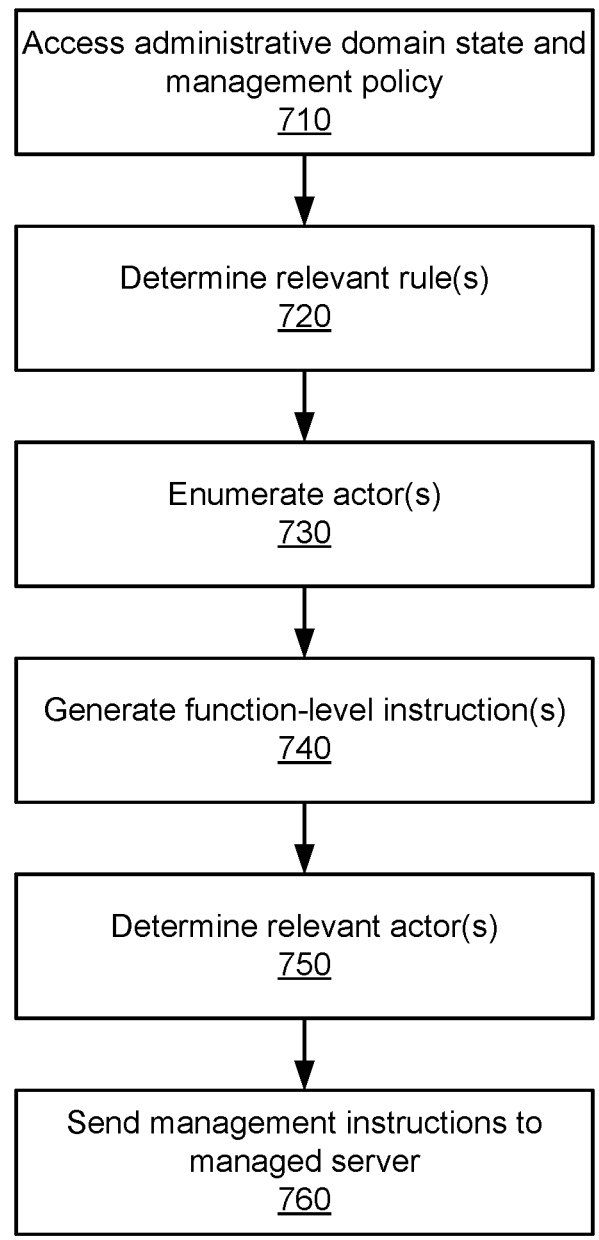
FIG. 7 is a flowchart illustrating a method of enforcing an administrative domain-wide management policy, according to one embodiment.

FIG. 7 is a flowchart illustrating a method of enforcing an administrative domain-wide management policy, according to one embodiment. For example, once the global manager generates 540 a rule for regulating communications based on user groups, the global manager enforces an administrative domain-wide management policy based on the rule. The process illustrated in FIG. 7 shows the details of the steps for enforcing the administrative domain-wide management policy. Other embodiments can perform the steps in different orders and can include different and/or additional steps. In addition, some or all of the steps can be performed by entities other than those shown in FIG. 1.

When the method 550 starts, the administrative domain state 320 and an administrative domain-wide management policy 330 have already been stored in the repository 300 of the global manager 120. At this point, the method 550 begins.

In step 710, the administrative domain state 320 and the administrative domain-wide management policy 330 are accessed. For example, the policy engine module 340 sends a request to the repository 300 and receives the administrative domain state 320 and the administrative domain-wide management policy 330 in response.

In step 720, one or more relevant rules are determined. For example, the policy engine module 340 executes the relevant rules module 350, providing as input the administrative domain-wide management policy 330, the UID of the particular managed server 130, and a UID of a service group. The relevant rules module 350 outputs a set of rules that are relevant to both the managed server 130 and the service group (management policy perspective).

In step 730, actors are enumerated. For example, the policy engine module 340 executes the actor enumeration module 370, providing as input the administrative domain state 320. The actor enumeration module 370 generates a representation of the managed servers 130, labeled devices 150, and unmanaged device groups (UDGs) within the administrative domain state 320 in an enumerated form (actor-sets).

In step 740, one or more function-level instructions are generated. For example, the policy engine module 340 executes the function-level instruction generation module 360, providing as input the management policy perspective (generated in step 720). The function-level instruction generation module 360 generates function-level instructions relevant to the input service group.

In step 750, one or more relevant actors are determined. For example, the policy engine module 340 executes the relevant actors module 380, providing as input the actor-sets (generated in step 730) and the management policy perspective (generated in step 720). The relevant actors module 380 outputs only those actor-sets that are relevant to those rules (relevant actor-sets).

In step 760, management instructions are sent to the particular managed server 130. For example, the policy engine module 340 sends the function-level instructions (generated in step 740) and the relevant actor-sets (generated in step 750) to the particular managed server 130.

Configuring the Management Module

Figure 8:
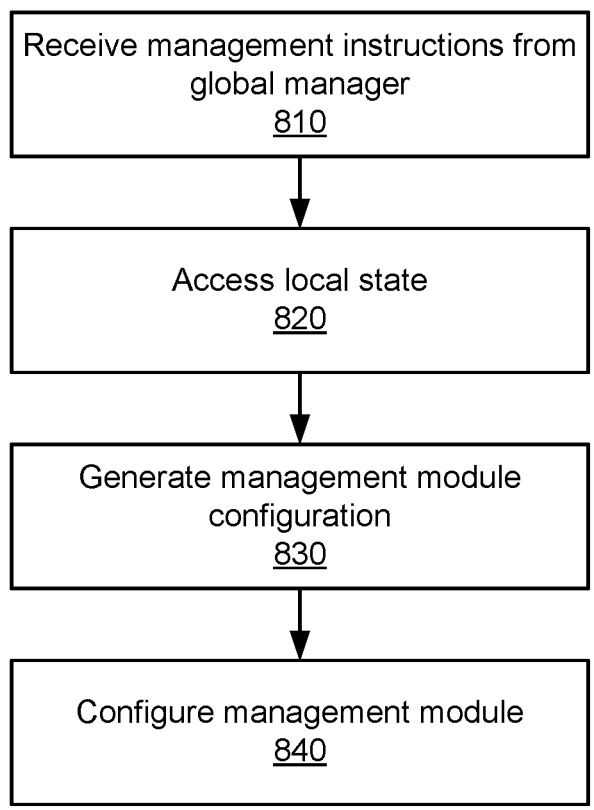
FIG. 8 is a flowchart illustrating a method of generating a configuration for a management module of a managed server, according to one embodiment.

FIG. 8 is a flowchart illustrating a method of generating a configuration 134 for a management module 132 of a managed server 130, according to one embodiment. For example, a managed server 130 may receive management instructions for regulating communications originating from a managed server with a user from a user group logged in. Alternatively, a server providing a service may receive management instructions for regulating communications received by the server from managed servers. The steps performed by such servers for configuring the management module are illustrated in FIG. 8. Other embodiments can perform the steps in different orders and can include different and/or additional steps. In addition, some or all of the steps can be performed by entities other than those shown in FIG. 1.

When the method 800 starts, information regarding the local state of the managed server 130 has already been stored in the local state repository 400 of the policy implementation module 136 in the managed server 130. At this point, the method 800 begins.

In step 810, management instructions are received from the global manager 120. For example, the policy compilation module 410 receives function-level instructions and relevant actor-sets from the global manager 120.

In step 820, the local state is accessed. For example, the policy compilation module 410 accesses information regarding the local state of the managed server 130 that is stored in the local state repository 400.

In step 830, a management module configuration 134 is generated. For example, the policy compilation module 410 takes as input the management instructions (received in step 810) and the local state (accessed in step 820) and generates a management module configuration 134.

In step 840, a management module 132 is configured. For example, the policy compilation module 410 configures the management module 132 to operate in accordance with the management module configuration 134 (generated in step 830).

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of managing security in a network domain, the method comprising:
receiving information describing one or more user groups, each user group containing one or more users associated with the network domain;
receiving an access control rule specifying an association between a first user group and a first set of labeled servers, the access control rule indicating that users of the first user group are permitted to access the first set of labeled servers;
determining that a user of the first user group is logged into a managed device;
generating, based on the access control rule, first management instructions for enforcing the access control rule at the managed device logged into by the user in the first user group, the first management instructions for regulating communications between the managed device and the first set of labeled servers based on a user identifier of the user while the user in logged into the first managed device;
generating based on the access control rule, second management instructions for enforcing the access control rule at the first set of labeled servers, the second management instructions for regulating communications between the first set of labeled servers and the managed device based on a device identifier of the managed device that is independent of the user logged into the first managed device;
sending the first management instructions to the managed device, the first management instructions to configure a firewall of the managed device to implement the access control rule with respect to communications to or from the managed device;
sending the second management instructions to the first set of labeled servers, the second management instructions to configure respective firewalls of the first set of labeled servers to implement the access control rule with respect to communications to or from the first set of labeled servers.

2. The method of claim 1, further comprising:
storing, by the managed device, the first management instructions in memory;
receiving an indication of the user logging out of the managed device; and
responsive to receiving the indication of the user logging out of the managed device, disabling the first management instructions stored in the memory.

3. The method of claim 2, further comprising:
receiving an indication of a subsequent user login to the managed device by the user; and
responsive to determining that the user is logged in again, enabling the first management instructions stored in the memory.

4. The method of claim 1, further comprising:
receiving, from the managed device, information indicating that a second user logged into the managed device;
generating a third management instructions regulating communications between the managed device and a second set of labeled servers related to user groups containing the second user; and
sending the third management instructions to the managed device.

5. The method of claim 1, further comprising:
receiving, from the managed device, an indication of the user logging out of the managed device;
sending a request to the managed device to disable the first management instructions; and
sending a request to the first set of labeled servers to disable the second management instructions.

6. The method of claim 1, wherein the access control rule has a provided by portion and a used by portion, wherein the provided by portion specifies a label set for the first set of labeled servers that provide a service and the used by portion specifies a label set comprising one or more labels identifying the one or more user groups.

7. The method of claim 1, wherein the management instructions configure the managed device to block a communication responsive to receiving a request for a communication to another server providing a service that is not associated with the user group of the user currently logged in to the managed device.

8. The method of claim 7, further comprising:
receiving an alert responsive to the managed device blocking the communication, the alert indicating a request for an unauthorized access.

9. The method of claim 1, wherein the information describing one or more user groups is received from a directory and identity service.

10. The method of claim 9, further comprising:
periodically synchronizing with the directory and identity service to receive updated information describing the one or more user groups.

11. A non-transitory computer readable storage medium storing executable instructions for managing security in a network domain, the instructions when executed by a processor causing the processor to perform steps including:
receiving information describing one or more user groups, each user group containing one or more users associated with the network domain;
receiving an access control rule specifying an association between a first user group and a first set of labeled servers, the access control rule indicating that users of the first user group are permitted to access the first set of labeled servers;
determining that a user of the first user group is logged into a managed device;
generating, based on the access control rule, first management instructions for enforcing the access control rule at the managed device logged into by the user in the first user group, the first management instructions for regulating communications between the managed device and the first set of labeled servers based on a user identifier of the user while the user in logged into the first managed device;
generating based on the access control rule, second management instructions for enforcing the access control rule at the first set of labeled servers, the second management instructions for regulating communications between the first set of labeled servers and the managed device based on a device identifier of the managed device that is independent of the user logged into the first managed device;
sending the first management instructions to the managed device, the first management instructions to configure a firewall of the managed device to implement the access control rule with respect to communications to or from the managed device;
sending the second management instructions to the first set of labeled servers, the second management instructions to configure respective firewalls of the first set of labeled servers to implement the access control rule with respect to communications to or from the first set of labeled servers.

12. The non-transitory computer readable storage medium of claim 11, wherein the stored instructions further comprise instructions for:
receiving, from the managed device, information indicating that a second user logged into the managed device;
generating a third management instructions regulating communications between the managed device and a second set of labeled servers related to user groups containing the second user; and
sending the third management instructions to the managed device.

13. The non-transitory computer readable storage medium of claim 11, wherein the stored instructions further comprise instructions for:
storing, by the managed device, the first management instructions in memory;
receiving an indication of the user logging out of the managed device; and
responsive to receiving the indication of the user logging out of the managed device, disabling the first management instructions stored in the memory.

14. The non-transitory computer readable storage medium of claim 13, wherein the stored instructions further comprise instructions for:
receiving an indication of a subsequent user login to the managed device by the user; and
responsive to determining that the user is logged in again, enabling the first management instructions stored in the memory.

15. The non-transitory computer readable storage medium of claim 11, wherein the stored instructions further comprise instructions for:
receiving, from the managed device, information indicating that a second user logged into the managed device;
generating a third management instructions regulating communications between the managed device and a second set of labeled servers related to user groups containing the second user; and
sending the third management instructions to the managed device.

16. The non-transitory computer readable storage medium of claim 11, wherein the stored instructions further comprise instructions for:
receiving, from the managed device, an indication of the user logging out of the managed device;
sending a request to the managed device to disable the first management instructions; and
sending a request to the first set of labeled servers to disable the second management instructions.

17. A method of managing security in a network domain, the method comprising:
receiving information describing one or more user groups, each user group containing one or more users associated with the network domain;
receiving an access control rule specifying an association between a first user group and a first set of labeled services, the access control rule indicating that users of the first user group are permitted to access the first set of labeled services;
determining that a user of the first user group is logged into a managed device;
generating, based on the access control rule, first management instructions for enforcing the access control rule at the managed device logged into by the user in the first user group, the first management instructions for regulating communications between the managed device and the first set of labeled services based on a user identifier of the user while the user in logged into the first managed device;

generating based on the access control rule, second management instructions for enforcing the access control rule at one more servers providing the first set of labeled services, the second management instructions for regulating communications between the first set of labeled services and the managed device based on a device identifier of the managed device that is independent of the user logged into the first managed device;

sending the first management instructions to the managed device, the first management instructions to configure a firewall of the managed device to implement the access control rule with respect to communications to or from the managed device; and sending the second management instructions to the one or more servers providing the first set of labeled services, the second management instructions to configure respective firewalls of the one or more servers to implement the access control rule with respect to communications to or from the one or more servers.

18. The method of claim 17, further comprising:

storing, by the managed device, the first management instructions in memory;

receiving an indication of the user logging out of the managed device; and responsive to receiving the indication of the user logging out of the managed device, disabling the first management instructions stored in the memory.

19. The method of claim 18, further comprising:

receiving an indication of a subsequent user login to the managed device by the user; and responsive to determining that the user is logged in again, enabling the first management instructions stored in the memory.

20. The method of claim 17, further comprising:

receiving, from the managed device, information indicating that a second user logged into the managed device;

generating a third management instructions regulating communications between the managed device and a second set of labeled servers related to user groups containing the second user; and sending the third management instructions to the managed device.

* * * * *